Patented May 22, 1923.

1,456,111

UNITED STATES PATENT OFFICE.

EDWARD GOODRICH ACHESON, OF NEW YORK, N. Y.

CLAY PRODUCT AND PROCESS OF PREPARING SAME.

No Drawing. Application filed October 5, 1920, Serial No. 414,914. Renewed March 15, 1923.

*To all whom it may concern:*

Be it known that I, EDWARD GOODRICH ACHESON, a citizen of the United States, residing at New York, in the county of New York and State of New York, have invented certain new and useful Improvements in Clay Products and Processes of Preparing Same, of which the following is a specification.

This invention is a novel process applicable to the treatment of clay-bearing deposits for the separation and recovery of clay in the form of particles of extreme fineness, the resulting clay product being adapted for a variety of uses in the arts, and more particularly for the manufacture of soap-compositions as described in my copending application Serial Number 414,915, filed October 5, 1920. My invention comprises also the product of the said process. As one step in the process according to the present invention, the clay component is subjected to a deflocculating operation whereby a certain percentage of the particles undergo deflocculation in the known manner; and these deflocculated particles are later flocculated by the action of an electrolyte, being thereby converted into aggregates which, although very minute, are nevertheless separable from water by subsidence or filtration or similar methods which are not directly applicable to the collection of particles in the deflocculated state. Preferably the deflocculated material is re-flocculated in presence of fine material which has not undergone deflocculation, or has not been completely deflocculated, the product in this case being an intimate mixture of non-deflocculated and re-flocculated particles. This product I have found useful for many purposes in the arts, including the manufacture of ceramic products, as a filler for paper, etc.

My process in a typical embodiment involves some or all of the following steps, although it is to be understood that the invention is not limited to the use of any particular mechanical appliances; nor to the employment of all of the described operations.

The clay-bearing material as mined is thoroughly agitated in water, and the suspensible portion is discharged into a Dorr thickener or equivalent apparatus, by which the lighter particles, including the clay, are separated from the sand and grit. The clay is then settled out from the bulk of the water in settling tanks of any approved type, and is then passed into filters, preferably of the continuous or semi-continuous vacuum type, whereby the moisture-content of the cake is suitably reduced. In the preferred embodiment of the invention the moisture-content of the clay is reduced at this stage to 20-25%.

In the filter cake thus formed I incorporate a suitable deflocculating agent such for example as the products extracted from roasted starchy materials by means of aqueous solutions of ammonia, methylene-amines or the like, together with sufficient moisture to bring the total moisture content to about 27-28%; and the whole is then subjected to a process of attrition, whereby a certain percentage of the material, say 4-5% or upward, is converted into the deflocculated or permanently suspensible state. This step of the process may be carried out substantially in the manner disclosed in my prior U. S. patents, and more particularly patents numbered 1,223,350; 1,253,556; 1,345,305 and 1,345,306.

The entire product from the deflocculating mill, referred to in practice as the "mill-paste", and comprising a mixture of non-deflocculated or partially deflocculated with fully deflocculated particles, is then transferred to an agitator in which it is mixed with water and thoroughly stirred, and thence discharged into a classifying device, preferably a door thickener.

The finer and lighter effluent from the thickener comprises the fully deflocculated or permanently suspensible (colloidal) particles resulting from the deflocculating operation, and also those particles which sufficiently approximate this condition to remain suspended in the water under the classifying conditions. This effluent is run into a settling tank, preferably of wood, and receives a small addition of a flocculating agent (electrolyte) such for example as a mineral acid, alum, sodium chlorid or the like. The whole of the solid material, including that which has undergone deflocculation, is thereby precipitated, and may be collected upon a vacuum filter, and if desired further dried in an oven or other appropriate drying apparatus. This material constitutes the product of the present process, and is readily distinguishable from the components separated from clay by ordinary methods of levigation and washing, being not only more minutely and evenly subdivided, but also, it is believed, more readily subdivisible into still finer particles, these characteristics being due to the particles or a considerable portion of them having passed through the above described operations of deflocculation and reflocculation; and being physically apparent from the pronounced film-forming and lather-producing quality of the soap-compositions containing clay prepared in this manner, and in other ways.

The tailings from the above classifier are returned to the deflocculating mill, their moisture content being first appropriately reduced, if required, by means of the vacuum filter.

Soap compositions containing clay which has undergone a deflocculating treatment are claimed in my copending application above identified.

While I have described my process in its entirety as applicable to the treatment of clay-bearing deposits, and as including the preliminary separation of the clay from associated gravel, sand or the like, it will of course be understood that the process is directly applicable to the treatment of clays in any stage of refinement, the essential steps so far as refined clays or clays substantially free from sand or grit are concerned being their subjection to the deflocculating treatment, followed by re-flocculation and recovery of the so-treated material.

I claim:—

1. In a process of treating clay bearing materials, the steps comprising subjecting the clay particles, freed from grit, to attrition in presence of a deflocculating agent whereby a portion of the same is transformed into a colloidal state, and then precipitating the colloidal particles in presence of the residual fine material and collecting the product.

2. The hereindescribed novel clay product, comprising an intimate mixture of non-deflocculated and re-flocculated particles.

In testimony whereof, I affix my signature.

EDWARD GOODRICH ACHESON.